Oct. 28, 1941. J. B. TESTORI 2,260,648
SIGNALING SYSTEM
Filed Dec. 1, 1937

INVENTOR.
John B. Testori
BY Daniel G. Cullen
ATTORNEY.

Patented Oct. 28, 1941

2,260,648

UNITED STATES PATENT OFFICE 2,260,648

SIGNALING SYSTEM

John B. Testori, Detroit, Mich.

Application December 1, 1937, Serial No. 177,397

2 Claims. (Cl. 200—58)

This application relates to wheeled vehicles having inflated tires and discloses signaling systems for indicating that tires of the vehicles have become deflated: most particularly are such systems useful with trailers where the operators of trailer-equipped vehicles do not sit in the trailers and are therefore unable normally to sense the deflation of the tires.

An embodiment of the system of this application is disclosed diagrammatically in Figs 1–2 of the appended drawing.

Referring to the drawing, it will be seen that

Fig. 1 shows the embodiment diagrammatically, and that

Figure 1:
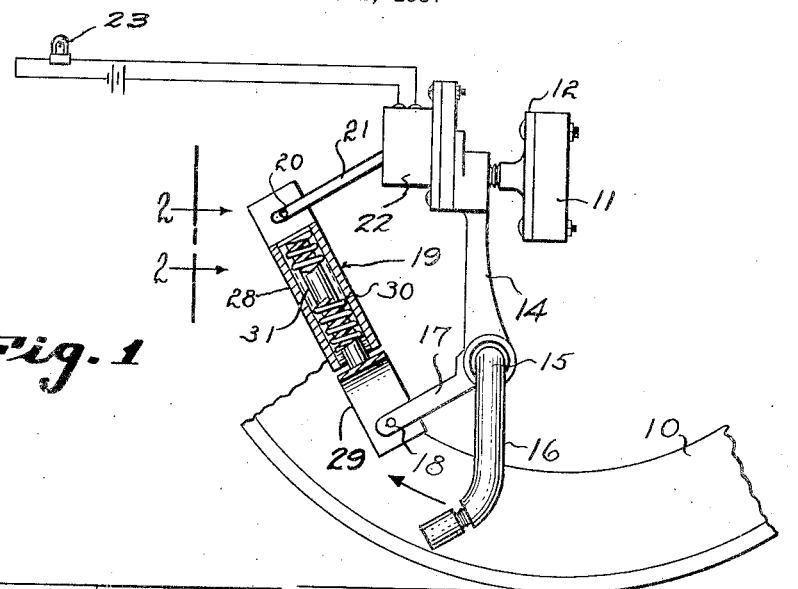
Figure 2:
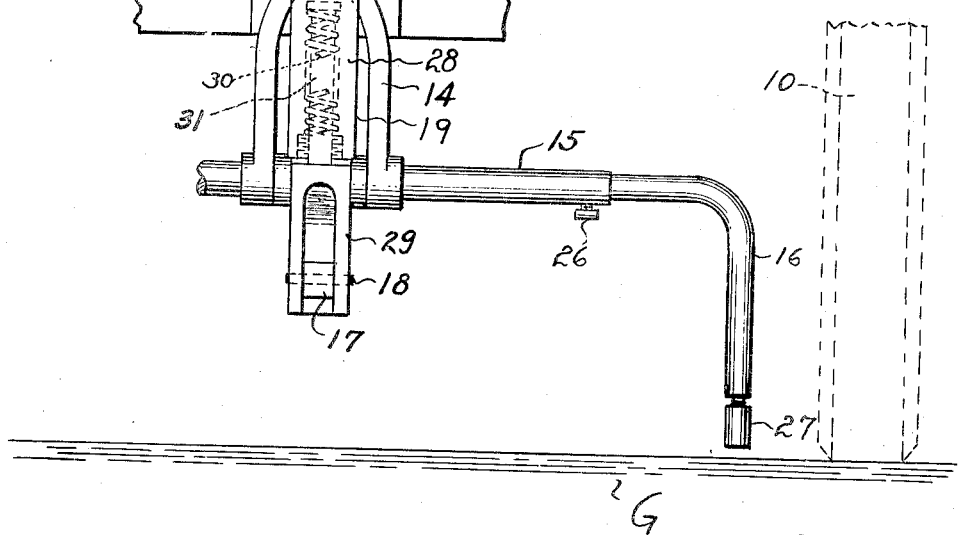
Fig. 2 is a view as if on line 2—2 of Fig. 1.

Further referring to the drawing it will be seen that Figs. 1 and 2 show, as if rolling clockwise on the ground indicated by the line G, a tire 10 mounted on and concentric with the axle 11 of an automobile on which is mounted the device of my invention. This device includes a support 12 bolted to the axle in a suitable fashion and to which is secured a depending arm 14 whose lower end is formed as a stirrup journalling a crank rod 15 having a depending crank arm 16 normally elevated a slight distance above the ground level. Secured to the crank rod 15 is a crank arm 17 which is fastened by a pin 18 to the lower end of a complex link indicated generally at 19 whose upper end is secured by a pin 20 to the operating arm 21 of a switch 22 mounted on the upper end of the support 12 and controlling the circuit in which is a signal light 23 disposed within the cab of the hauling vehicle.

It will be understood that when a tire is inflated to normal level that the lower end of the crank arm 16 is clear of the ground level and under such circumstances the parts are in the position of Fig. 1 with the switch 22 open and with the signal light 23 dark. If, however, the tire 10 becomes deflated, the lower end of the crank arm 16 will strike the ground and be rotated clockwise or as shown by the arrow to rotate the crank arm 17 also clockwise and through the action of the complex link 19 to raise the switch arm 21 and close the switch 22 to energize the circuit and cause the signal light to brighten and indicate to the driver that a tire of the trailer has become deflated.

It will, of course, be understood that there may be one or two crank arms 16 formed on the crank rod 15. Preferably there will be two, one for each tire concentric with the axle 11.

It will also be understood that there may be as many sets of actuating means of the character indicated for circuit controlling switches as desired. Preferably there will be provided for each tire of the trailer a depending arm 16 with suitable linkages and actuating means to cause illumination of the signal light in the cab of the hauling vehicle on the deflation of any of the tires.

It will also be observed that for purposes of fine adjustment the crank rod 15 may be formed separate from the crank arm 16, as shown in Fig. 2, so that the latter may be moved transversely of the vehicle as well as rotatably adjusted with respect to the axis of the crank rod, with the parts clamped in finally adjusted position by suitable means such as the set screw 26. Also for fine adjustment the crank arm 16 may be formed as two separate parts, one of which supports the other, with the latter being in the form of a button 27 screw-threaded into the end of the crank arm proper.

In order to provide lost motion in the complex link 19, sufficient to permit elongation of the link in the event the crank arm 16 is caused to rotate counterclockwise, as for example in the event the vehicle is backing up and the lower end of the crank arm 16 is engaged by an obstruction and is caught momentarily and is caused to rotate contra to normal rotation, the complex link 19 is formed of two parts 28 and 29 with the former acting as a cylinder for the latter which is formed as a plunger, and a spring 30 in the cylinder and surrounding the stem 31 therewithin maintains the parts 28—29 close together but permits them to be separated for momentary elongation of the link; the spring will, of course, draw the parts together again after the crank arm 16 has freed itself of the obstruction.

Now having described the herein disclosed embodiments of my signaling systems, reference will be had to the claims which follow for a determination of my inventions.

I claim:

1. Means adapted to operate a signal to indicate the loss of pressure in the pneumatic tires of a vehicle in which the vehicle has a signal operating switch and switch arm attached to an axle thereof, comprising a supporting arm depending below the axle, a crank rod rotatively mounted in said supporting arm, a crank arm carried by said rod and having a free end located adjacent one of the vehicle tires in close proximity to the ground surface over which the vehicle travels, said crank arm being adapted to move in a clockwise direction when said free end contacts the ground while the vehicle is moving in a forward direction, a second crank arm attached to said crank rod and movable therewith, and a complex link structure having relatively movable cooperable parts one thereof being attached to said switch arm and the other connected to said second crank arm whereby to permit counterclockwise movement of said crank rod and both of said crank arms upon contact of the free end of said first named crank arm with the ground surface during movement of the vehicle in a reverse direction.

2. Means adapted to operate a signal to indicate the loss of pressure in the pneumatic tires of a vehicle in which the vehicle has a signal operating switch and switch arm attached to an axle thereof, comprising a supporting arm depending below the axle, a crank rod rotatively mounted in said supporting arm, a crank arm carried by said rod and having a free end located adjacent one of the vehicle tires in close proximity to the ground surface over which the vehicle travels, said crank arm being adapted to move in a clockwise direction when said free end contacts the ground while the vehicle is moving in a forward direction, and a complex link structure having relatively movable telescoping parts one thereof being attached to said switch arm and the other connected to said crank rod, a coil spring interposed between said parts and yieldably holding them together in cooperative telescopic relation whereby to permit counterclockwise movement of said crank rod and crank arm upon contact of the free end of the crank arm with the ground surface during movement of the vehicle in a reverse direction.

JOHN B. TESTORI.